Aug. 28, 1951     L. B. OSTERBUR ET AL     2,565,663
APPARATUS FOR DRYING AND STORING SHELLED GRAIN
Filed March 13, 1948                          2 Sheets-Sheet 1
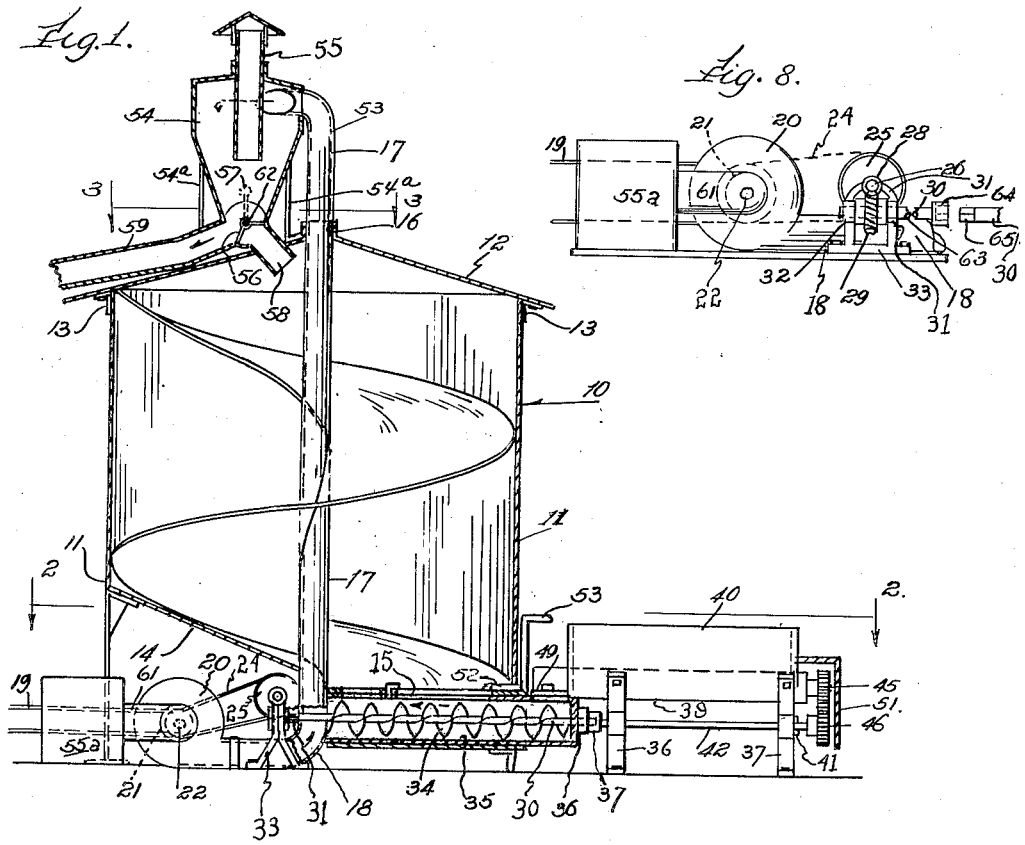
Inventors.
Lewis B. Osterbur.
George W. Collins.
by John F. Brezina
Attorney.

Aug. 28, 1951  L. B. OSTERBUR ET AL  2,565,663
APPARATUS FOR DRYING AND STORING SHELLED GRAIN
Filed March 13, 1948  2 Sheets-Sheet 2
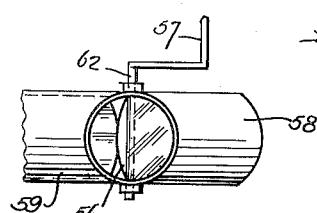
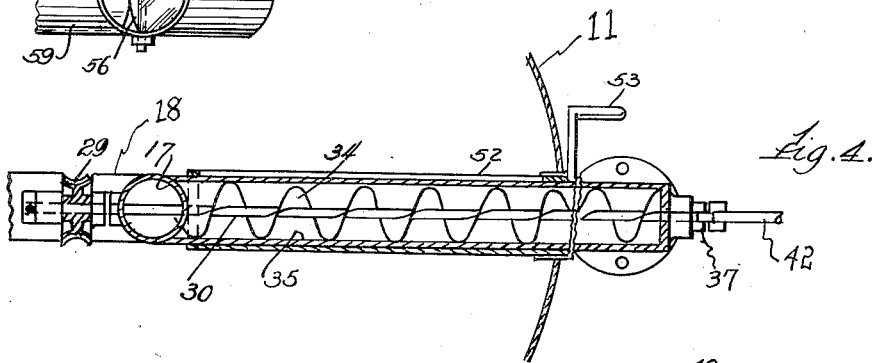
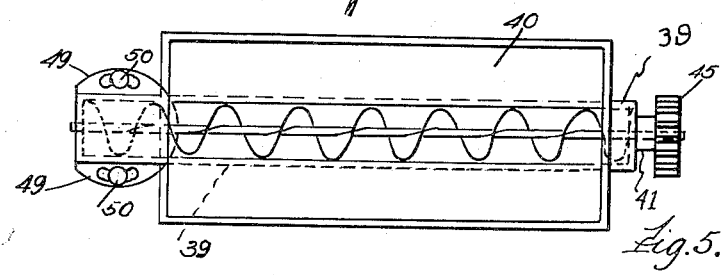
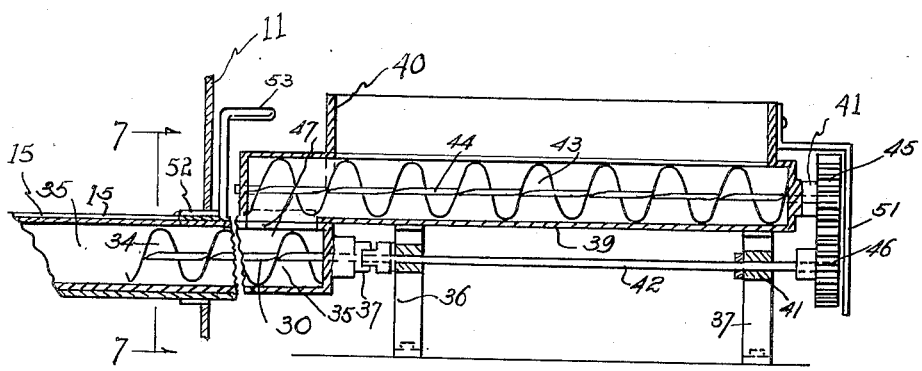
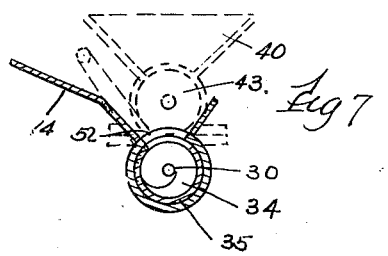
Inventors:
Lewis B. Osterbur
George W. Collins
by John F. Brezina
Attorney.

Patented Aug. 28, 1951

2,565,663

UNITED STATES PATENT OFFICE 2,565,663

APPARATUS FOR DRYING AND STORING SHELLED GRAIN

Lewis B. Osterbur and George W. Collins, Onarga, Ill.

Application March 13, 1948, Serial No. 14,806

5 Claims. (Cl. 34—57)

The storage of ear corn in cribs and the like for substantial lengths of time sufficient to dry out the corn to a degree to make it suitable for shelling and suitable for standards of moisture content and dryness required by grain buyers and users has been practiced for many years throughout many of the United States. In a large proportion of instances, such storage of ear corn in cribs has been expressly for the purpose of allowing the corn to dry sufficiently to make it salable and to meet the requirements of the market.

Such practice necessitates and involves several relatively expensive factors, namely: (1) The labor and time of unloading the corn from a wagon or truck into the crib, which in many instances involves shovelling the corn by hand overhead into the crib bins; (2) the necessity of relatively large investment in crib space sufficient to accommodate the respective crops in ear corn form; (3) the maintenance of cribs of relatively large area to maintain same in usable condition; (4) the labor of removing the ear corn from the cribs at the time of shelling same; (5) the loss in the tie-up of investment in the ear corn during periods of drying, making it impossible to realize the market prices for corn at the most advantageous times.

These disadvantageous factors are encountered by thousands of farmers in every county where corn is a current crop, and the losses are especially large in areas where due to unfavorable weather conditions, the corn has had to be harvested with a relatively high moisture content.

A still further loss factor encountered in many areas is caused by early frosts which stop the ripening of corn and leave only the alternative of harvesting corn crops in a condition unsuitable for sale in the market channels, and leaving usually the only alternative of feeding the corn to live stock and poultry.

Our invention has as one of its objects and accomplishments the elimination of the aforesaid disadvantageous and loss factors, and provides a means and method of drying the corn at the time it is harvested and is placed in the crib or bin.

A further object and accomplishment of our invention is the provision of a novel crib or building structure having one or more outlets in its floor or bottom and a series of pipes or conduits defining a closed bin and partially encircling the crib and communicatively connected at the upper end of the crib whereby shelled corn or other grain may be recirculated through the crib or bin and through the pipes as many times as desired in order to effect a drying of the grain sufficient to permit its storage in sealed form in a space considerably smaller than required for storing the equivalent volume of corn in ear form.

A further object of our invention is to provide a relatively inexpensive portable or stationary crib or bin having one or more upper inlets and one or more bottom inlets and having a screw conveyor at its bottom portion communicatively connected to the upper end of the crib or bin by a series of pipes through which air is adapted to be forced to convey the grain from the area adjacent said conveyor to drop the same into the upper portion of the bin, and wherein said bin or storage container has a spiral chute or shelf therein adapted to cause grain from all the areas of the bin to flow by gravity to such conveyor to be recirculated to the extent desired.

A further object of our invention is the provision of a drying device for grain or the like, either portable or stationary, which includes the combination of a container for a spiral chute, a delivery conveyor adapted to be power driven; an upwardly extending pipe means through which driven air is forced, a collector or hopper at the upper end portion of said container which communicates with said pipe; and means for selectively returning the grain which is moved upwardly through said pipe either back into the container or to a point outside of said container, said device providing for selective recirculation of grain from and through said container, said pipe and said collector, so as to dry the grain to the desired degree.

A further object is the provision of a device for drying grain or the like having an outer driven conveyor, an inner driven conveyor, the outer conveyor being adapted to deliver grain to the inner conveyor; a bin or container having a spiral chute therein, a series of blower pipes extending through said container and above the same, a hopper or collector at the upper end of said container adapted to receive the grain blown upwardly through said pipe, and selective means for discharging the grain from said collector either back into said container or points outside thereof, and means for forcing air in an upward direction through said pipes.

Other and further objects of our invention will be apparent in the following description and appended claims.

On the drawings:

Fig. 1 is a partially sectional view taken on a vertical plane through the center of my device and showing a part of the conveying means in elevation.

Fig. 2 is a cross-section view taken on a plane indicated by lines 2—2 of Fig. 1.

Fig. 3 is an enlarged cross-section view of the lower portion of the collector or hopper and taken on line 3—3 of Fig. 1.

Fig. 4 is a slightly enlarged view taken from above and looking at the bottom of the container or bin and showing a part of the inner screw conveyor in cross-section below the bottom opening.

Fig. 5 is an enlarged top-plan view looking from above at the outside hopper and screw conveyor and shown in side elevation at the right of Fig. 1.

Fig. 6 is a cross-section view taken on a vertical plane substantially through the center of the outside hopper and outside conveyor and through an end portion of the inner horizontal conveyor adjacent the floor of the container.

Fig. 7 is a cross-section view taken on line 7—7 of Fig. 6.

Fig. 8 is a diagrammatic view of portable power and blower means.

Referring to the drawing, reference numeral 10 designates a container, bin or crib which is preferably cylindrical and which may be made of either wood or metal, though metal is preferable. Its size may vary in a wide range according to desire. The side wall of the crib 10 is designated 11 and same may be provided with a large number of small holes if desired which holes are of a size smaller than the individual particles of grain to be stored or processed.

Container 10 has a roof or top 12 which is mounted, either permanently or removably upon the upper periphery of wall 11. When secured, brackets 13 with suitable bolts or screws (not shown) may be utilized to secure the outer periphery to the wall 11, two of said brackets being shown in Fig. 1.

The bottom or floor 14, preferably made of metal, is secured by a suitable fastening means (not shown) and preferably in a position above the lower extremity of wall 11. Said floor is substantially cone-shaped and has an elongated outlet opening 15 therein for a purpose hereinafter defined. Roof 12 has a substantially central opening 16 through which upward-extending pipe or conduit 17 extends.

Pipe 17, hereinafter referred to as a blow pipe or elevator pipe, extends downward through a central opening in floor 14 and communicatively connects with an elbow 18 which in turn is either removable or permanently connected to the outlet port of the casing of a portable and movable driven air blower 20. Blower 20 may be driven by any suitable power means, one form of which is illustrated in Fig. 1 as a belt 19 adapted to be driven from a tractor or other power unit, said belt engaging pulley 21 on the shaft 22 of the blower 20.

Said shaft 22 has a second and smaller pulley 23 thereon on which is mounted an endless belt 24, as shown in Fig. 2, said belt 24 being mounted on a pulley 25 of shaft 26 of power transmission unit as shown in Figs. 1 and 2. Said power transmission unit is preferably portable and movable from one crib or container to another along with the blower means.

Shaft 26 is journalled in suitably spaced bearing blocks 27 which are supported in a pair of standards or supports 33. Shaft 26 has secured thereon a screw 28 which meshes with a pinion 29 at the end the substantially horizontal conveyor shaft 30 whose end portion (shown at the left of Figs. 1 and 2) is journalled in passaged boss 31 which boss is carried in a gear casing (not shown).

In Fig. 2 is shown the pinion 29 which is secured on the end portion of shaft 30.

Shaft 30 has a spiral screw conveyor 34 secured thereon in the usual manner, for example by welding, and said conveyor 34 normally rotates and is housed within an elongated tubular shell or case 35 which is communicatively connected either removably or permanently at one end thereof to an opening in the vertical pipe 17, as indicated in Fig. 1. The opposite end portion of said conveyor shell 35 extends through wall 11 and projects a short distance therebeyond as indicated in Fig. 1, and the driven shaft 30 projects beyond the bearing member 36 a short distance and is removably connected to a coupling 37 as indicated in Figs. 1, 4 and 6.

As shown in elevation in Fig. 6, numerals 36 and 37 designate a pair of portable metal supports, standards or legs which extend upwardly and provide a supporting means for an elongated tube-like conveyor housing 39 and for an upwardly opening hopper or chute 40 which are preferably made of metal. The outermost standard 38 has a passage therethrough in which is mounted a bearing 41 as shown in Fig. 6. A horizontally extending shaft 42 is journalled in bearing 41 and has its end portion nearest to shaft 30 removably connected to coupling 37. Said shaft 42 is in alignment with shaft 30, and its outer end portion projects beyond standard 38 as indicated.

As shown in Figs. 6 and 2, a screw conveyor 43 is rotatably mounted within the elongated housing 39 and has a central shaft 44 which is journalled for rotation in the end portions of the housing 39 in a conventional manner. The outer projecting end of conveyor shaft 44 has secured thereon a gear 45, as shown at the right of Fig. 6 and said gear 45 meshes with gear 46 mounted on the end of shaft 42.

It will be understood that power driven rotation of the conveyor 34 and its shaft will be transmitted through said coupling 37, said shaft 42, and through gears 46 and 45 to rotate the screw conveyor 43 in a direction to cause movement of granular particles toward the inner end of the housing 39 to be dropped by gravity through a lower opening 47 of housing 39 into the open outer end portion of the housing or casing 35 of the inner conveyor 34.

As shown in the top-plan view of Fig. 5, the hopper 40 is of substantially rectangular shape with inwardly and downwardly converging side walls and provides a convenient means of pouring or dumping grain or the like through said hopper into the conveyor housing 39. As shown at the left of Fig. 5, the inner end portion of the housing 39 has formed integral therewith flat metal oppositely extending ears 49. Securing screws 50 pass to removably mount and connect said conveyor housing 39 to the end portion of the conveyor housing 35. As shown at the right of Fig. 6, an angular bracket or guard 51 is secured by a bolt to the outer end portion of hopper 40 and its end portion are disposed in a vertical direction adjacent to the outer faces of the gears 45 and 46.

As shown in the left-hand portion of Fig. 6, we provide a manually adjustable closure means for the lower elongated opening 15 in the floor 14 of the crib or container. This preferably comprises an elongated transversely curved metal panel baffle or gate 52 of arcuate cross section which slides or partially rotates upon the upper portion of the conveyor housing 35. A manually operable handle or crank 53 has one end thereof connected to the outer end portion of said closure baffle or gate 52 to provide for selectively opening and closing of the opening 15.

As shown in the upper portion of Fig. 1, the upper end portion of the elevator pipe 17 carries an elbow 53 which is communicatively and removably connected to the upper portion of metal hopper or collector 54 which is suitably supported with respect to the roof 12, for example by legs or brackets 54a or operably with respect to any other stationary object. Said collector 54 which is removable so as to be mountable from one crib to another, is provided with an upwardly extending stack or pipe 55 through which dust and the like may readily escape.

The lower portion of the hopper or collector 54 has an outlet opening as indicated in Fig. 1 in which is suitably mounted preferably by a transverse pin or shaft 62, an angular valve or baffle 56 whose position is controlled by an outwardly extending crank or lever 57 (see Fig. 3). A relatively short outlet pipe 58 connects the lower portion of hopper 54 with the interior of the container or crib 10, said pipe being removable and said pipe extending through a suitable opening in the roof 12. A second pipe 59 has one end thereof connected to lower end portion of said hopper and extends to points outside of the crib or container to any length desired and provides a means to selectively cause the materials circulated to fall by gravity either into a vehicle or into one or more other storage bins or any other area or position desired, which area may be, for example, one or more adjacent storage bins or compartments. It will be understood that when the valve 56 is in the position shown in Fig. 1, the circulated grain will drop by gravity through pipe 59 to areas outside the crib, and when the valve 56 is swung to its other position wherein it obstructs the entrance to pipe 59, the opening to pipe 58 will be opened to allow grain falling through the hopper to drop back into the container, bin or crib 10 for selective recirculation if desired.

As indicated in Figs. 1 and 2, we desire it to be understood that a heating unit be operatively connected to heat the air which is blown into the elevator pipe by the driven blower 20, this is to say, when the moisture content of the grain or other particles is such that recirculation of existing outside air will not dry the circulated grain with one circuit satisfactorily, the operation will be repeated.

In Figs. 1 and 2 is illustrated diagrammatically a heater 55a which is removably connected to the central inlet part of the blower 20 by a pipe 61. Such heater may be of the electrical type or any other conventional form.

In Fig. 8, we have diagrammatically illustrated the air propulsion means including the blower 20 and connecting elbow 18 and a fragment of driving belt 19 separately, along with the transmission unit which includes the supporting standards 31, journalled shaft 26 and directly connected parts. In Fig. 8, we illustrate a fragment of a separate transmission shaft 63 which has one end thereof secured to the pinion 29 and driven by such pinion through the aforesaid power transmission means. Another fragment of said shaft is provided with a non-round portion, for example a square shank 64 which is removably connected to a socket portion 65 of the shaft 63. It will be understood that as the power driven blower 20 and said transmission means including supports 33 are portable so as to be movable to and connectable to different containers or cribs, relatively longer shaft 63 may be quickly and easily mounted in position so that one end thereof having a socket 64 will drive shaft 30 when the blower and said transmission means is positioned outside of the radius of a crib or bin. When the said power driven blower means and transmission means are to be moved to another container unit such as described, the connection shaft 63 is removed along with the blower means and transmission means to a position adjacent to another container or crib and a section of additional pipe, (not shown) is used to communicatively connect the outlet of the blower 20 to the vertically extending elevator pipe of such container or crib.

As many changes could be made in the above construction, and many apparently widely different embodiments of our invention, within the scope of the claims constructed without departing from the spirit or scope thereof, it is intended that all matter contained in the accompanying specification shall be interpreted as illustrative and not in a limiting sense.

We claim:

1. In a combination grain drying and storage device; a substantially cylindrical container having an upper opening; a bottom in said container having a manually controllable valved opening; a collector mounted above said container and being adapted to selectively feed grain into said container or to points outside said container; a spiral grain chute secured on the inside wall of said container and having its lower discharge end adjacent said valved opening; screw conveyor means below said valved opening and having an inlet exterior of said container; a tube extending upwardly in said container and into said collector and communicating with said conveyor; means on said collector for discharging grain therefrom either into said container or outside thereof, said grain being adapted to run from the outer areas of said container along said spiral chute and into and through said screw conveyor; and power driven blower means for blowing air upwardly through said tube whereby the grain will be carried upwardly by said air through said tube and into said collector to be selectively discharged into said container.

2. In a device for recirculating and drying grain, a large container; a collector mounted above said container; a conduit connected to said collector and having a manually operable valve means therein and being adapted to permit feeding of grain from said collector into said container or to positions outside said container; a spiral chute within said container over which the grain in said container is to travel; a manually operable valve in the floor of said container and being adapted to permit the grain from said container to be eliminated therefrom; a blowpipe extending through said container and being communicatively connected to said collector; a conveyor beneath said container and adapted to feed grain into said blowpipe, said conveyor being adapted to deliver grain to said blowpipe from a source outside said container or from said container; and means for forcing air through said blowpipe.

3. In a device for recirculating and drying grain having a container, a blowpipe extending through said container, a spiral chute for the grain in said container, and having a collector above said container and being adapted to selectively feed grain into said container and being communicatively connected to said blowpipe; said container having a lower manually closeable opening being adapted to permit passage of grain from said chute; a spiral conveyor extending beneath said opening; a conveyor shaft on which said conveyor is secured; a pinion for driving said conveyor; a second shaft carrying a screw adapted to mesh with said pinion; a wheel on said second shaft; a belt for driving said wheel; a second wheel for driving said belt; a third shaft on which said second wheel is secured; a blower connected to said blowpipe and being drivable by said third shaft, said conveyor being adapted to selectively deliver grain from said chute or from a source outside said container to said blowpipe.

4. In combination, a container for storing and recirculating grain or the like, said container having an upper inlet opening and a bottom outlet opening; an elevator pipe in said container and being communicatively connected with the upper opening and with the lower opening of said container; a spiral chute mounted along the inside wall of said container and extending from the area below the upper inlet opening of said container and to adjacent the bottom outlet opening of said container, said spiral chute being of a width sufficient to provide for grain discharged thru said inlet opening to slide and roll along said chute in a spiral path to thereby cause the rolled grain to be exposed for a relatively longer period to the air in said container and to thereby prevent said grain from piling up into a pile mass in the central part of said container; power driven means adapted to force air through said elevator pipe and to cause grain conveyed into the lower portion of said elevator pipe to be conveyed through said elevator pipe to cause its discharge into the upper inlet opening of said container; manually operable closure means in the bottom portion of said container for selectively closing said bottom outlet opening; and driven conveyor means for selectively moving grain either from adjacent the bottom outlet opening of said container or from points outside of said opening into and through said elevator pipe, the grain discharged upon and rolling along said spiral conveyor being adapted to be selectively recirculated through said elevator pipe and through said container and along said spiral chute.

5. In a device for recirculating grain or the like for the purpose of drying same, a cylindrical container having a lower discharge opening; a blower and a housing for said blower; a collector-hopper mounted above said container and having a discharge portion opening into the upper portion of said container; an upwardly and transversely extending tube extending through said container and communicatively connecting an outlet of said blower housing and said collector-hopper; a relatively wide spiral chute mounted adjacent the inside annular face of the side wall of said container, said spiral chute providing a guideway and track for grain discharged into the upper portion of said container whereby said grain will roll and tumble in a circuitous path through said container to thereby effect substantial drying of said grain; the lower end portion of said spiral chute being adjacent to the outlet opening of said container; an elongated conveyor housing having an opening normally communicating with the outlet opening of said cylindrical container and said conveyor housing having a discharge opening communicating with the lower portion of said tube; a drivable conveyor in said conveyor housing adapted to move grain discharged from said spiral conveyor into said tube and into the path of air circulated in said tube, the blown air circulated in said tube being adapted to discharge the grain into said collector-hopper; and manually operable valve means mounted in the lower portion of said collector-hopper adapted to provide for selective discharge and return of grain into said spiral chute for recirculation thereof.

LEWIS B. OSTERBUR.
GEORGE W. COLLINS.

REFERENCES CITED

The following references are of record in the file of this patent:

UNITED STATES PATENTS

| Number | Name | Date |
| --- | --- | --- |
| 1,043,158 | Simmons | Nov. 5, 1912 |
| 2,069,192 | Behr et al. | Jan. 26, 1937 |
| 2,262,190 | Meade | Nov. 11, 1941 |
| 2,342,528 | Carbaugh | Feb. 22, 1944 |
| 2,465,928 | Reese | Mar. 29, 1949 |

FOREIGN PATENTS

| Number | Country | Date |
| --- | --- | --- |
| 515,443 | Germany | Oct. 21, 1927 |